Figure 1:
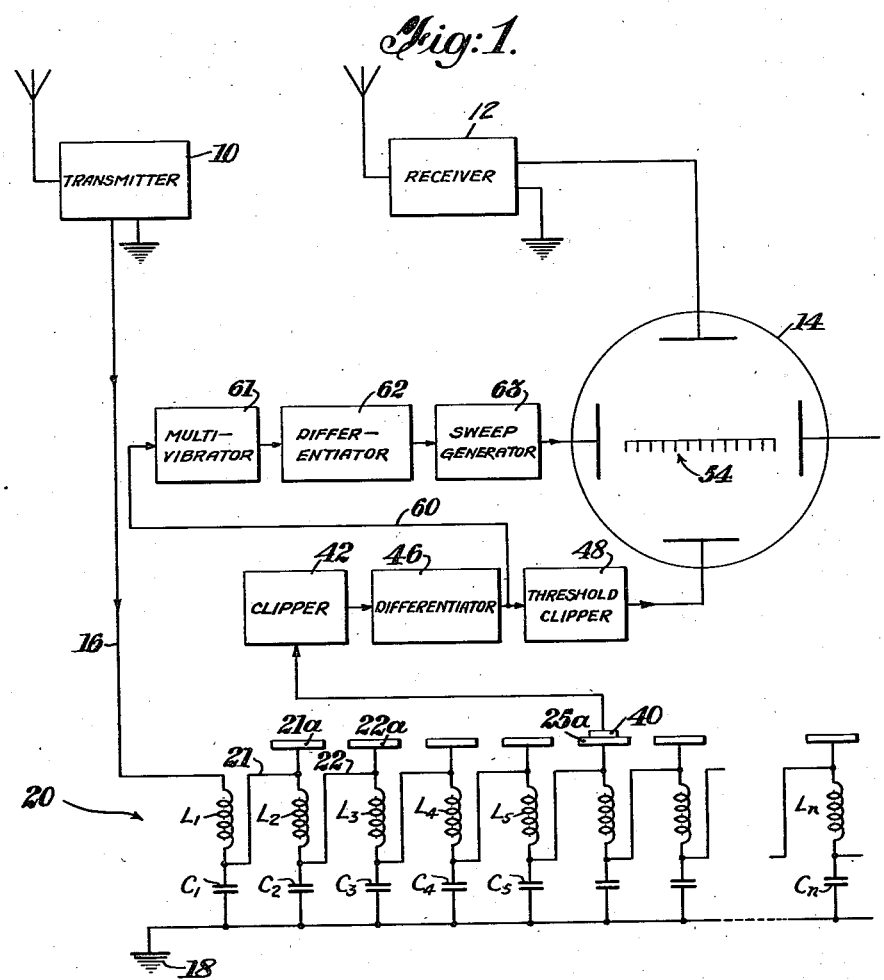

Fig. 2.

Patented Sept. 9, 1947

2,426,989

UNITED STATES PATENT OFFICE 2,426,989

RADIO DETECTION SYSTEM

Louis A. de Rosa, Staten Island, N. Y., assignor to Federal Telephone and Radio Corporation, Newark, N. J., a corporation of Delaware Application December 4, 1942, Serial No. 467,835

7 Claims. (Cl. 250—1.66)

This invention relates to radio detection systems such as used for detection of hostile aircraft and ships and more particularly to a system for calibrating and timing an oscillograph used in radio detection systems.

In my copending application entitled "Radio detection system" Serial No. 464,008, filed October 31, 1942, I disclose radio detection systems having first and second oscillographs, the first oscillograph to provide a panoramic view of a total effective range such as 200 miles or more and the second oscillograph to provide a magnified view of a small portion of the total range such as 20 to 50 miles more or less. The first or panoramic oscillograph provides for an approximate measure of the distances to obstacles the echoes of which appear on the oscillograph while the second or vernier oscillograph provides for vernier measurements of such distances. Where the vernier oscillograph covers a portion of the range spaced from a reference point such as the point of transmission of a radio detection impulse, the length of this space is, of course, carefully determined in order to effect vernier measurement of distances as well as the timing of the calibration for the vernier oscillograph.

It is an object of this invention to provide for a vernier oscillograph of a radio detection system with a sweep potential and a train of calibration pulses the initiation of which is selectable with respect to the transmission of a radio detection impulse.

Another object of this invention is to provide a system for generation of a train of calibration pulses and to selectively vary the timing of the initiation of the train with respect to a synchronizing pulse.

A further object of the invention is to provide a combination delay and wave producing network.

The above and other objects ancillary thereto will become more apparent upon consideration of the following detailed description to be read in connection with the accompanying drawings, in which:

Fig. 1 is a schematic illustration of a vernier oscillograph for a radio detection system in accordance with this invention, and Fig. 2 is a graphical illustration showing the manner in which the timing of the calibration pulses and the discard interval are determined.

Referring to Fig. 1, I show fragmentarily and by block diagram a transmitter 10 and a receiver 12 of a radio detection system together with a vernier oscillograph 14 with means for calibrating and timing the oscillograph in accordance with this invention. For a more complete understanding of radio detection systems provided with panoramic and vernier oscillographs to which this invention is applicable, reference may be made to my aforementioned copending application Serial No. 464,008.

Pulse energy 15 (Fig. 2) in synchronism with the transmission of impulses by the transmitter 10 is applied over a connection 16 to a combination delay and wave producing network 20. The network comprises a multiplicity of tuned oscillatable circuits arranged in tandem, each circuit including an inductance coil L and a condenser C. The first circuit of the series is shown to comprise the coil $L_1$ and a condenser $C_1$ arranged in series between the connection 16 and ground 18. The second circuit in the series is tapped off from the first circuit between the coil $L_1$ and the condenser $C_1$ by a connection 21. To this outlet connection 21 is a contact 21a from which the oscillations established in the first circuit may be taken off. The oscillations occurring in the first circuit are applied from the connection 21 to the second circuit including a coil $L_2$ and a condenser $C_2$. The output 22 of the second circuit delivers the oscillations thereof to a second tap 22a and to a third circuit having a coil $L_3$ and a condenser $C_3$. This network continues in the same fashion to the $n$th circuit having a coil $L_n$ and a condenser $C_n$.

In Fig. 2, I show the initiating pulse 15 which operates to shock excite the circuits $L_1C_1$, $L_2C_2$, etc., of the network 20. The first circuit $L_1C_1$ produces a wave train of oscillations 31. Due to the lag produced in the coil $L_1$, the first voltage surge to reach the output connection 21 will have a delay of 90° with respect to the occurrence of the pulse 15. Thus, the wave 31 will start 90° or a time interval $t_1$ after the occurrence of the pulse 15. Likewise, the output 22 of the second circuit $L_2C_2$ will have a wave train 32 which is initiated 90° after the initiation of the wave train applied thereto from the first circuit $L_1C_1$. Thus, the wave train 32 will be 180° or a time interval $t_2$ delayed with respect to the pulse 15. It will thus be clear that each successive circuit of the network 20 will have an output delayed 90° with respect to the oscillations of the next preceding circuit. Thus, for the fifth circuit $L_5C_5$, the wave output 35 thereof will have a lag of 5×90° or 450° lag, indicated as $t_5$, with respect to the pulse 15.

When a build-up occurs on $C_1$, the potential of the build-up is impressed upon the next circuit $L_2C_2$ and the latter circuit oscillates at $$\frac{1}{2f_c}$$

where $$f_c = \frac{1}{2\pi\sqrt{L_2\left(\frac{C_1C_2}{C_1+C_2}\right)}}$$

By the proper proportioning of the values of L and C for the successive circuits a relationship can be obtained as follows:

$$L_1C_1 = L_2\left(\frac{C_1C_2}{C_1+C_2}\right) = L_3\left(\frac{C_2C_3}{C_2+C_3}\right) = L_n\left(\frac{C_nC_{n-1}}{C_{n-1}+C_n}\right)$$

This circuit relationship has a time delay equal to $$\frac{\pi}{\sqrt{CL}}$$

Should it be desirable to provide a discard interval equal to 450° ($t_5$) as obtainable from the output tap of circuit $L_5C_5$, a movable contact 40 would be placed in contact with the output tap 25a. The tap 40 is connected to a clipper 42 whereby the wave 35 is clipped between the levels 44 and 45 as indicated on Fig. 2. This provides a wave of rectangular form which when differentiated by a differentiator 46 a wave train of alternate positive and negative pulses 50 and 51 is provided. This wave train of pulses may be used directly for calibration purposes or the train of pulses may be passed through a threshold clipper 48 such as a class "C" amplifier and then applied to the deflection plates of the oscillograph 14. The threshold clipping if applied to the positive pulses 50 as indicated by the threshold level 53 will provide unidirectional pulses 54.

In order to synchronize the sweep potential for the oscillograph in accordance with the delay relation of the calibration pulses, I provide a connection 60 at the output of the differentiator 46 and apply the initial pulse of the train of pulses to a multivibrator 61. The multivibrator is preferably biased so that it will be triggered from one state of operation to a second state of operation by the initial pulse of the series of pulses and continue in said second state of operation for a predetermined period at the end of which it returns to said one state of operation. The period is so selected as to cause the return to occur between successive synchronizing pulses 15. The wave form produced at the output of the multivibrator is then differentiated by a differentiating circuit 62 and the pulse produced by the wave front of the multivibrator potential is used to trigger the sweep generator 63. Thus, a sweep potential for the vernier oscillograph 14 is synchronized with the initial pulse of the train of calibrating pulses regardless of the delay existing between the synchronizing pulse and the initial pulse of the train.

While I have described above the principles of my invention in connection to a specific apparatus, it is to be clearly understood that this description is made only by way of example and not as a limitation on the scope of my invention as set forth in the objects thereof and the accompanying claims.

I claim:

1. A system for calibrating an oscillograph at selected time intervals with respect to the occurrence of a synchronizing pulse comprising wave generating means, means for applying synchronizing pulses to said wave generating means, said wave generating means being responsive to each synchronizing pulse to generate a plurality of waves each initiated at a different time with respect to the initiating synchronizing pulse, means for selecting the energy of one of said waves, means to produce pulses from the energy of the selected wave for calibration purposes, a sweep voltage generator for the oscillograph, and synchronizing means responsive to the initial pulse of the series of calibration pulses produced from the selected wave to synchronize the operation of said sweep voltage generator with the selected wave, whereby the calibrations appear at the same relative relation on the oscillograph regardless of which wave is selected.

2. The system defined in claim 1 wherein the synchronizing means comprises a multivibrator biased to return after a predetermined interval to one state of operation each time it is triggered from said one state of operation to a second state of operation, means to trigger said multivibrator in synchronism with the wave front of a selected wave from said one state of operation to said second state of operation, and means utilizing the output of said multivibrator to synchronize the operation of said sweep voltage generator.

3. In a radio detection system having a transmitter, a receiver and an oscillograph for determining the distance to obstacles reflecting impulses transmitted by said transmitter, a timing circuit comprising wave generating means, means synchronized to the operation of said transmitter to apply a synchronizing pulse to said wave generating means each time an impulse is transmitted, said wave generating means being responsive to each synchronizing pulse to generate a plurality of waves each initiated at a different time with respect to the initiating synchronizing pulse, means for selecting the energy of one of said waves, a sweep voltage generator for the oscillograph, and synchronizing means responsive to the leading portion of the selected wave to synchronize the operation of said sweep voltage generator.

4. The system defined in claim 3, wherein said synchronizing means includes means to produce a series of pulses from the energy of the selected wave and means responsive to the initial pulse of said series to synchronize the operation of said sweep voltage generator.

5. The system defined in claim 3 wherein said synchronizing means includes means to produce a series of pulses from the energy of the selected wave and means responsive to the initial pulse of said series to synchronize the operation of said sweep voltage generator, the system further including a deflecting circuit for said oscillograph, and means to apply said series of pulses to the deflecting circuit for calibration of the sweep line produced by the oscillograph.

6. In a radio detection system having a transmitter, a receiver and an oscillograph for determining the distance to obstacles reflecting impulses transmitted by said transmitter, wave generating means, means synchronized to the operation of said transmitter to apply a synchronizing pulse to said wave generating means each time a detecting impulse is transmitted, said wave generating means being responsive to each synchronizing pulse to generate a plurality of waves each initiated at a different time with respect to the initiating synchronizing pulse, said generator having a plurality of output terminals one for each of said waves, output means selectively connectable to said terminals, means for clipping the output wave of said output means to produce a substantially rectangular wave, means for translating the leading and trailing edges of the rectangular pulse portions of said rectangular wave into narrow width pulses, a multivibrator triggerable from one state of operation to a second state of operation in response to the leading pulse produced from each rectangular wave, said multivibrator being arranged to return to said one state of operation a predetermined time interval after each triggering operation, and means responsive to the triggering operation of the multivibrator to generate a sweep potential for said oscillograph, whereby said sweep potential is synchronized with the selected wave.

7. The system defined in claim 6 wherein the system further includes a deflecting circuit for the oscillograph, and means for threshold clipping the output of said translating means, thereby producing a series of unidirectional pulses, and means to apply said series of pulses to said deflecting circuit for calibration of the sweep line of said oscillograph.

LOUIS A. DE ROSA.

REFERENCES CITED

The following references are of record in the file of this patent:

UNITED STATES PATENTS

| Number | Name | Date |
|---|---|---|
| 1,908,249 | Hund | May 9, 1933 |
| 1,628,992 | Mills | May 17, 1927 |
| 1,874,196 | Lamson | Aug. 30, 1932 |
| 2,165,028 | Blumlein | July 4, 1939 |
| 1,543,475 | Lemmon | June 23, 1925 |
| 2,121,359 | Luck et al. | June 21, 1938 |
| 2,178,074 | Kakel et al. | Oct. 31, 1939 |
| 2,208,378 | Luck | July 16, 1940 |
| 2,212,648 | Poch | Aug. 20, 1940 |
| 2,232,044 | Bedford | Feb. 18, 1941 |
| 2,234,830 | Norton | Mar. 11, 1941 |
| 2,227,598 | Lyman et al. | Jan. 7, 1941 |
| 2,280,226 | Firestone | Apr. 21, 1942 |

FOREIGN PATENTS

| Number | Country | Date |
|---|---|---|
| 111,594 | Australia | Mar. 19, 1939 |